Oct. 12, 1926.

E. BURHORN 1,602,845

SPRAY NOZZLE

Filed Feb. 3, 1925

Inventor;
Edwin Burhorn
by
Rogers, Kennedy & Campbell,
Attorneys.

Patented Oct. 12, 1926.

1,602,845

UNITED STATES PATENT OFFICE.

EDWIN BURHORN, OF HOBOKEN, NEW JERSEY.

SPRAY NOZZLE.

Application filed February 3, 1925. Serial No. 6,559.

This invention is a novel spray nozzle, capable of various uses, for example as a water cooling means, having reference to an upwardly directed nozzle arranged above a pond, tank or other receptacle, for spraying into the atmosphere the water to be cooled, a prior example of which is shown in my Patent 1,520,929 of December 30, 1924.

The main object of the present invention is to afford a nozzle of the kind referred to which will effectively spread or spray the heated water and which nevertheless will be free from the need of frequent cleaning by hand due to clogging of the restricted passages of the nozzle by reason of accumulation of solid matter which frequently occurs in the water. Another object is to permit the adjustment of the nozzle to change the spraying effect. Other objects and advantages of the invention will be elucidated in the hereinafter following description of one form or embodiment thereof or will be apparent to those skilled in the art.

To the accomplishment of such objects and advantages the present invention consists in the novel nozzle shown and described herein and the novel features of construction, arrangement, combination and detail thereof.

Figure 1:
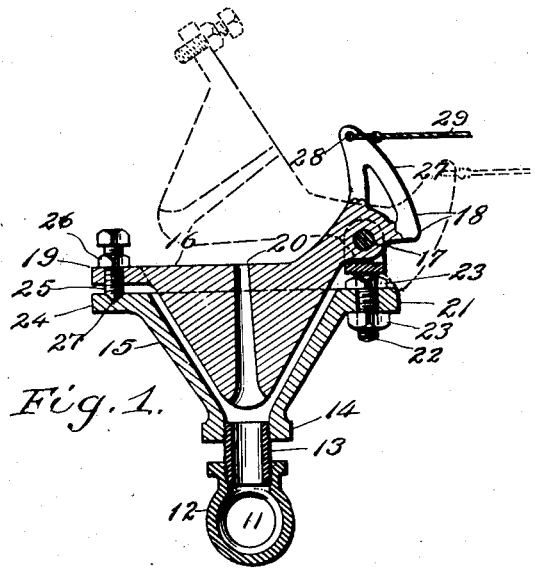

In the accompanying drawings Fig. 1 is a vertical cross section of a spray nozzle embodying the features of the present invention.

Figure 2:
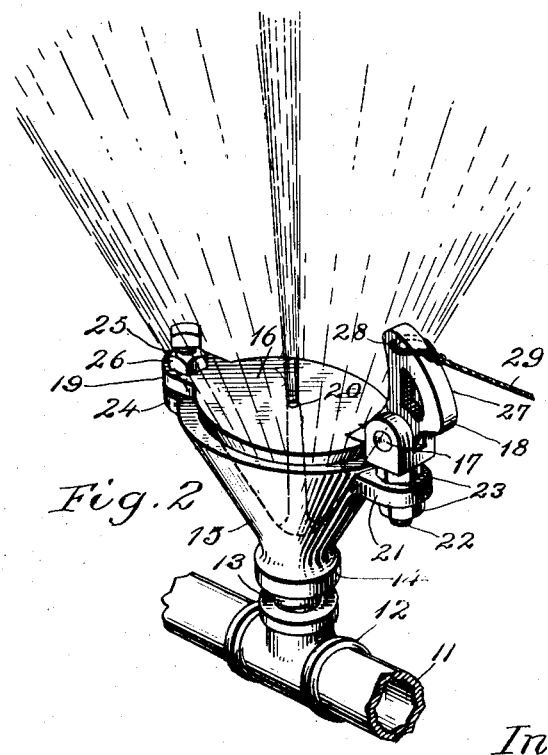

Fig. 2 is a perspective view of the same showing it in connection with pipes which may deliver warm water to the nozzle for the purpose of upward spraying.

The pipes 11 may be considered as horizontal pipes extended over a pool or other receptacle for the purpose of conducting warm or other water to a series of spray nozzles, of which one is shown in Fig. 2. A T fitting 12 is shown interposed in the pipe line, and coupled to the upward branch of the T is shown a short coupling pipe 13 connecting the same with the lower end 14 of the nozzle body 15, which consists of flaring walls enclosing a flaring chamber in which is fitted a tapered spreader 16. As will be seen the tapered spreader or body is movably fitted within the flaring exit of the nozzle, the spreader normally occupying the exit and thus affording narrow spray passages within the nozzle walls whereby the water will be thrown in a cone like or fan like manner into the atmosphere. While one or the other of the members might have spacing ribs operating to center the spreader and break up the spray into sections, this is unnecessary in view of the fittings to be described, which adequately serve to center the spreader, thus giving a peripheral form of spray, uninterrupted except by the two opposite fittings to be described. The movability of the spreader is for the purpose of permitting it to yield temporarily or swing outwardly so as to discharge any accumulation of matter within the nozzle. The interior of the walls of the nozzle are wholly free from obstruction or any projection, tending to catch and accumulate solid matters, but these are apt to accumulate behind the spreader itself. Solid matter such as sticks, straws and strings may be safely allowed to accumulate behind the spreader, rather than attempting to strain them out at an earlier point in the system. As the solid matters increase this produces an increase of resistance and therefore an increase of pressure in the water flowing through the nozzle. The spreader is held in place with a light pressure, so calculated that when a substantial degree of clogging has been reached the interior pressure will exceed the force holding the spreader in position, so that the latter may yield, swinging upwardly and out of the tapered exit, the force of the water thereupon carrying all of the solid matter cleanly out of the nozzle, the spreader automatically returning to normal position.

The nozzle walls 15 being shown as of substantially circular cross section the spreader 16 is indicated as a substantially conical piece of metal, sufficiently heavy for its own weight to hold it normally down to its seat. The cross section is indicated as not quite circular, but slightly elliptical, and may obviously be formed in a flat ellipse if the spray is desired to be of that form.

The spreader 16 may be movably mounted in various ways, a hinge 17 being shown arranged laterally at one side of the spreader. This hinge permits the spreader to yield upwardly at the time of discharge and to swing back into place after the nozzle is cleared of foreign matters. In order to stop the spreader from swinging outwardly too far it is shown as having an extension 18 beyond the pivot 17, adapted to contact a stationary part of the nozzle, and affording compact and simple limiting means.

At a point diametrically opposite the hinge 17 the spreader is shown formed with an extension 19, taking part in limiting the inward movement of the spreader and determining its normal operative position.

The water distributing effectiveness of the nozzle is increased herein, as indicated, by the provision of one or more apertures 20 through the body of the nozzle. By this arrangement the water may be sprayed not only peripherally in a conical form, but centrally upwards, improving the scattering action and cooling effect, which it is understood is produced through the effect of natural currents of air, and the evaporation of the water, acting to reduce the temperature of the water which descends and is collected for recirculation.

The nozzle body 15 is shown provided with an extension 21 at the hinge side of the nozzle. This extension is vertically apertured to receive a threaded vertical stud 22 held securely in place by lock nuts 23. The top end of the stud 22 supports the pin of the hinge 17. By this means the spreader may be vertically adjusted at the hinge side, thus accomplishing one of the objects of the invention.

In order to prevent unsymmetrical tilting of the spreader when vertically adjusting the hinge 17, there is shown at the free or swinging side of the nozzle an extension or lug 24 forming a stop or rest for a threaded pin or screw 25 engaging in threads in the extension 19 of the spreader and held in adjusted position by lock nut 26. The lug 24 may be formed with a tapered recess 27 to receive the rounded lower end of the pin 25, thus assisting to properly center the spreader when changing an adjustment. When adjusted the spreader will always be concentric within the nozzle walls and maintain its concentricity throughout adjustments.

If it is desired slightly to increase the width of the conical passages in the nozzle it is only necessary to loose the nuts 23 at the hinge side and the nut 26 at the free side and adjust the pins 22 and 25 so as to correspondingly elevate the two opposite sides of the spreader. To narrow the passages and increase the fineness of spray the reverse adjustment may be made.

It will be understood that when the spreader moves outwardly under the self discharging action it will subsequently return to position by the action of gravity, which action may be increased by the aid of an additional weight or a spring, as indicated in said prior patent.

It may be desirable to open up the nozzle at will, for the purpose of effecting a discharge whenever desired. For this purpose the outward extension of the spreader at the hinge side is shown as formed into an upstanding lever or arm 27, having at its extremity an eye 28 to which may be attached a cord or wire 29, thus enabling the cord to be pulled to swing down the arm 27 and lift the spreader out of the nozzle exit.

It will thus be seen that I have described an embodiment attaining the advantages of the present invention, but since many matters of design, arrangement and detail may be variously modified without departing from the principles, it is not intended to limit the invention to such matters except as set forth in the appended claims.

What is claimed is:

1. A water cooling spray nozzle for throwing a spray of water upward into natural air currents, the same having a flared exit forming a spreader chamber, and a tapered spreader normally occupying said chamber with its sides spaced from the chamber walls to leave a narrow discharge passage between them, the said spreader hinged at one side of the nozzle and arranged to yield upwardly automatically from excess pressure or obstruction, a stop for the spreader determining its closed position, means for adjusting said spreader and hinge inwardly and outwardly, and means for adjusting said stop in conformity with the adjustment of the hinge, whereby the spray effect may be varied.

2. A water cooling spray nozzle for throwing a spray of water upward into natural air currents, the same having a flared exit forming a spreader chamber, and a tapered spreader normally occupying said chamber with its sides spaced from the chamber walls to leave a narrow discharge passage between them, the said spreader hinged at one side of the nozzle whereby it may be swung upwardly to discharge obstruction, a stop for the spreader determining its closed position, means for adjusting inwardly and outwardly said spreader hinge and said stop whereby the spray effect may be varied.

In testimony whereof, I have affixed my signature hereto.

EDWIN BURHORN.